United States Patent Office 3,281,785
Patented Oct. 25, 1966

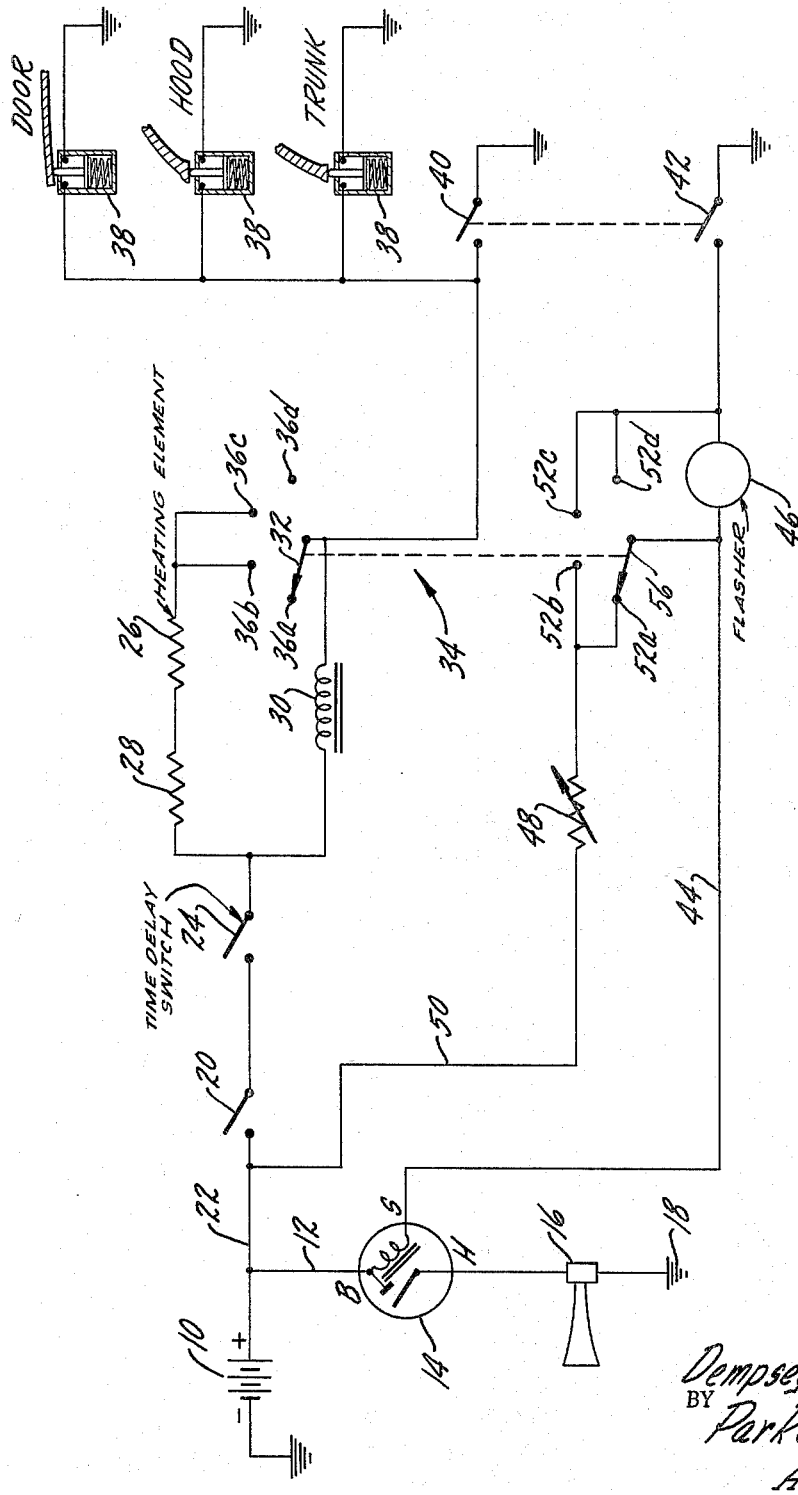

3,281,785
VEHICLE ALARM SYSTEM
Dempsey Oursler, 1030 S. May, Chicago, Ill.
Filed Feb. 11, 1964, Ser. No. 344,042
6 Claims. (Cl. 340—63)

This invention relates to a vehicle alarm system which may be actuated by opening any one of the vehicle doors, the hood, the trunk, or any similar closure element on the vehicle.

A primary purpose of the invention is an automobile alarm system of the type described in which there are switch means for selecting different forms of alarm operation.

Another purpose is an automobile alarm system of the type described in which the automobile horn is used as the alarm signal and in which the horn will operate continuously until shut off.

Another purpose is an automobile alarm system of the type described in which actuation of the automobile horn is used as an indication of a break-in, and in which the horn is arranged to operate intermittently until shut off.

Another purpose is an automobile alarm system of the type described in which the alarm indicator, whether it be the automobile horn or otherwise, is shut off a predetermined time interval after break-in and regardless of whether the alarm indicator is operated intermittently or continuously.

Another purpose is an automobile alarm system of the type described which is reliably operable.

Another purpose is an automobile alarm system which is inexpensive.

Other purposes will appear in the ensuing specification, drawing and claims.

The invention is illustrated diagrammatically in the enclosed circuit diagram illustrating the components forming the alarm system.

The vehicle alarm system may utilize the vehicle or automobile battery for the power supply, although this is not necessary. The positive terminal of the battery is indicated at 10 and is connected by a line 12 to the B terminal of the conventional horn relay 14. The H terminal of the horn relay 14 is connected to a horn 16 with the other side of the horn being grounded, as at 18.

A lock switch, preferably accessible from outside the vehicle, is the actuating switch for the alarm system, although it could be otherwise. In this case, the lock switch is indicated at 20 and is connected by a line 22 to the positive terminal 10 of the battery. A time delay switch 24 is connected in series with the actuating switch 20. The time delay switch 24 may be operated by an associated heating element 26 which is in series with resistor 28. The resistor 28 may be necessary only if the alarm system is used with a 12-volt battery. It is not necessary with a six-volt system. Connected in parallel with the heating element 26 and the resistor 28 is a relay coil 30. One side of the relay coil 30 is connected to the movable armature 32 of a rotary switch indicated diagrammatically at 34. The armature 32 may be moved into position for electrical contact with any one of contacts 36a, 36b, 36c or 36d.

A plurality of parallel push button switches are indicated at 38 and the switches 38 may take any convenient form, although it is practical to have a switch which is normally biased to the closed position. These switches may be mounted in the vehicle trunk, hood and doors such that when these closure elements are closed the switches are opened and when any one of these closure elements is opened a switch will close.

Relay coil 30 is effective to close switches or contacts 40 and 42, which are ganged together for simultaneous operation. These switches will remain closed as long as current is flowing through coil 30.

The S terminal of horn relay 14 is connected by line 44 to a flasher 46, which may be similar to a directional signal flasher of the type used on vehicles, but could be otherwise. The opposite side of flasher 46 is connected to switch 42. A variable resistor 48 may be connected by a line 50 to the positive terminal 10 of the battery with the opposite side of the resistor being connected to terminals 52a and 52b of switch 34. Armature 56 on switch 34 is effective to be moved into contact with any one of contacts 52a, 52b, 52c or 52d. Switch 34 includes armatures 32 and 56 and their associated contacts with the two armatures being ganged together for simultaneous rotary operation.

The use, operation and function of the invention are as follows:

The alarm system shown and described herein is actuated by the unauthorized opening of any one of a number of closure elements on the vehicle. For example, any one of the doors, the hood or the trunk. The alarm system is adapted for different types of operation. Considering the first form of operation, switch 34 is in position "a" or its armatures are in contact with contacts 36a and 52a. Switch 20 which is a lock switch operated from the outside of the vehicle is closed to place the alarm system in operation. This must be done after the operator leaves the vehicle. Switches 38 are all in the open position as the closure elements are all closed, and switch 24 is in its normally closed position. When any one of switches 38 is closed, by opening of a closure element, a circuit will be completed through coil 30 which will close switches 40 and 42. As soon as switch 40 is closed, the circuit through coil 30 is locked in until either switch 20 or switch 24 is opened. The closing of switch 42 completes a circuit from ground through flasher 46 to the S terminal of horn relay 14. The horn relay will then operate the horn or siren or other signal indicator, as the case may be. Also, as armature 56 is in contact with contact 52a, resistor 48 will be connected between the positive terminal 10 of the battery and one side of the flasher 46. The horn will operate in an intermittent manner with the cycle of operation determined by the size of resistor 48. The horn will continue to operate until shut off by the lock switch.

In a second form of operation, switch 34 is in the "b" position. When any one of switches 38 are closed, heater element 26 and resistor 28 are placed in parallel with coil 30. Flasher 46 is in the circuit and horn operation will be intermittent. After a predetermined interval, heater element 26 will cause time delay switch 24 to open which will cut off current to the coil and cause the circuit to open. There will be no further operation of the horn. The operation of the circuit when switch 34 is in the "b" position will provide intermittent operation of the horn for a predetermined interval.

When switch 34 is in the "c" position, time delay switch 24 will again be in the circuit. The horn will operate for a length of time determined by heater element 26. In this case armature 56 and contact 52c form a shunt around flasher 46 and the flasher is not in the circuit. Horn operation is continuous until switch 24 opens.

In the fourth or "d" position of switch 34, heater element 26 is out of the circuit and switch 24 will remain closed. Also, there is a shunt around flasher 46 so horn operation is continuous. In this position of switch 34 the horn will operate continuously until shut off by the lock switch 20.

The invention provides a compact and simply constructed automobile alarm system having different forms of operation. The means for indicating a break-in to the automobile may be the automobile horn, or a separate siren, or other type of indicator. The operation may be intermittent, continuous and for either a predetermined length of time or until shut off. Of particular advantage is the compact switch means for selecting any one of the different forms of operation. By utilizing the vehicle horn as well as the vehicle battery the number of components necessary to complete the alarm is kept to a minimum. The alarm system may be easily constructed and at a minimum expense.

In some applications the actual vehicle horn relay may be used in the alarm system whereas in others a separate relay may be used. In some applications the B terminal of the horn relay may be connected between switch 20 and switch 24 so that the horn relay is only connected to the battery when the lock switch is closed.

Whereas the preferred form of the invention has been shown and described herein, it should be realized that there are many modifications, substitutions and alterations thereto within the scope of the following claims.

What is claimed is:

1. In a vehicle alarm system, an electrical circuit to be connected between a source of power on the vehicle and an alarm indicator, said circuit including a plurality of switches, connected in parallel, and each adapted to be opened by the closing of a closure element on the vehicle and closed by opening of a closure element, an actuating switch in series with the parallel combination of switches and the power supply, a relay having a coil and contacts, said relay coil being in series with said actuating switch whereby closure of any one of said parallel switches and the actuating switch is effective to complete a circuit to permit the flow of current through the relay coil, said relay contacts being in series with said source of power and effective upon closure thereof to actuate said alarm indicator, means connected between said relay contacts and source of power for causing pulsating operation of said alarm indicator when the relay contacts are closed, cut-off means connected in series with said parallel combination of switches and actuating switch for opening the circuit through said coil after a predetermined time interval, and switch means for selecting any one, none, or both of said cut-off means and pulsating means, including a first group of contacts and a first armature movable into electrical contact with any one of said contacts for connecting said cut-off means into or out of said circuit, and a second set of contacts and a second armature movable into electrical contact with any one of said second set of contacts for connecting said pulsating means into or out of said circuit.

2. The circuit of claim 1 further characterized by a second set of relay contacts operated by said relay coil, said second set of relay contacts being connected in parallel with said parallel combination of switches.

3. The structure of claim 1 further characterized in that said cut-off means includes a heating element connected in parallel with said coil, and a switch, associated with said heating element, and in series with said actuating switch and adapted to be opened a predetermined time interval after initiation of current flow through the heating element.

4. The circuit of claim 1 further characterized in that said pulsating means includes a directional signal flasher.

5. The circuit of claim 1 further characterized in that said alarm indicator is the vehicle horn.

6. The circuit of claim 1 further characterized in that said first group of contacts and armature connect said cut-off means in parallel with said coil, said second set of contacts and second armature being effective to connect a resistor in series with said pulsating means and said power supply or to short said pulsating means from the circuit.

References Cited by the Examiner

UNITED STATES PATENTS

| | | | |
|---|---|---|---|
| 2,892,181 | 6/1959 | Benson et al. | 340—64 |
| 2,935,730 | 5/1960 | Procter | 340—63 |
| 3,074,049 | 1/1963 | Saliba et al. | 340—63 X |

NEIL C. READ, *Primary Examiner.*

A. H. WARING, *Assistant Examiner.*